United States Patent

[11] 3,547,217

| [72] | Inventor | Emmett Garza |
| | | 420 Redan, Houston, Tex. 77009 |
| [21] | Appl. No. | 867,055 |
| [22] | Filed | Oct. 16, 1969 |
| | | Continuation-in-part of Ser. No. 690,906, Dec. 15, 1967, abandoned. |
| [45] | Patented | Dec. 15, 1970 |

[54] VEHICLES PROTECTED BY ROBBERY DETERRENT APPARATUS
11 Claims, 16 Drawing Figs.

[52] U.S. Cl. ................................................. 180/112; 296/24
[51] Int. Cl. .......................................... B62d 33/00
[50] Field of Search .............................. 180/111—113, 82; 296/24

[56] References Cited
UNITED STATES PATENTS

| 2,031,344 | 2/1936 | Thomasma | 180/113 |
| 2,566,032 | 8/1951 | Poland | 296/24 |
| 2,884,279 | 4/1959 | Halstead et al. | 296/24 |
| 3,015,515 | 1/1962 | Halstead et al. | 296/24 |
| 3,169,599 | 2/1965 | Johnston | 296/24X |
| 3,214,211 | 10/1965 | Setina | 296/24 |
| 3,397,005 | 8/1968 | May et al. | 296/24 |
| 3,469,090 | 9/1969 | Redus | 296/24 |

*Primary Examiner*—Kenneth H. Betts
*Attorney*—William E. Ford

ABSTRACT: The invention is disclosed in manner to accentuate a bullet proof shield means behind front seats to completely separate driver or front compartment from passenger or rear compartment of a motor vehicle. The shield portion above the seats is transparent for vision. A coin tray is provided to be slid rearwardly to receive payment therein, and then to be drawn forwardly. The driver can turn switch means for battery operation of solenoid means in rear doors which lock these doors against an obstreperous passenger escaping as the driver drives the locked-in passenger toward the police station. The rear doors may have perforate metal plates installed thereon to prevent a rear seat passenger from breaking out a rear pane and firing through a front window. Air ducts from the air-conditioning system of the motor vehicle direct air-conditioned air to the rear compartment.

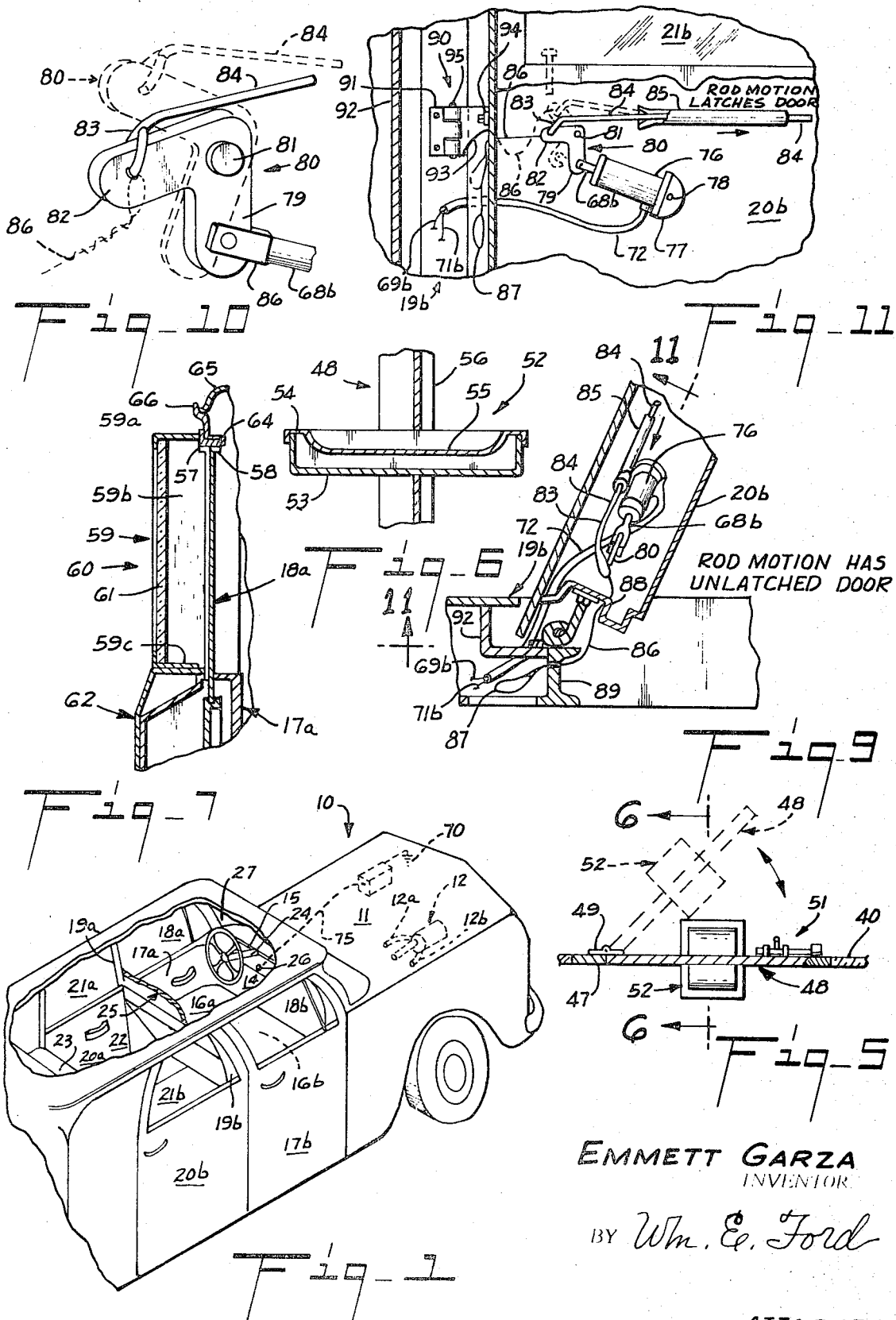

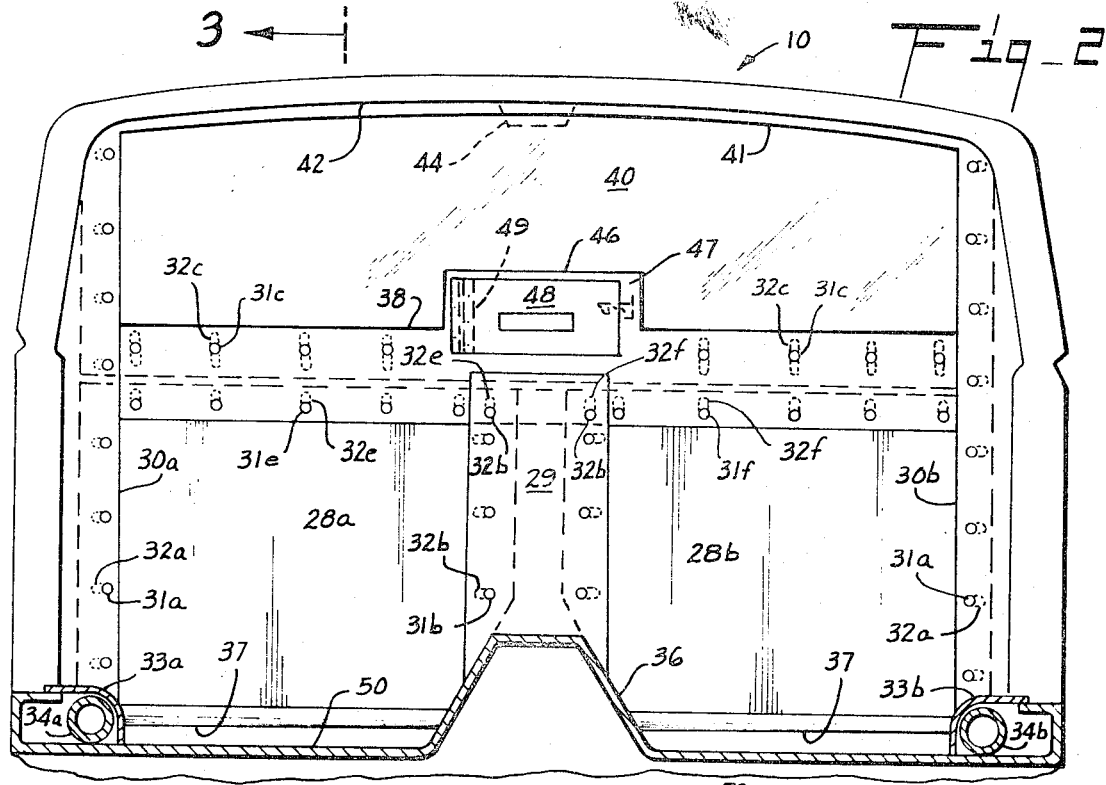
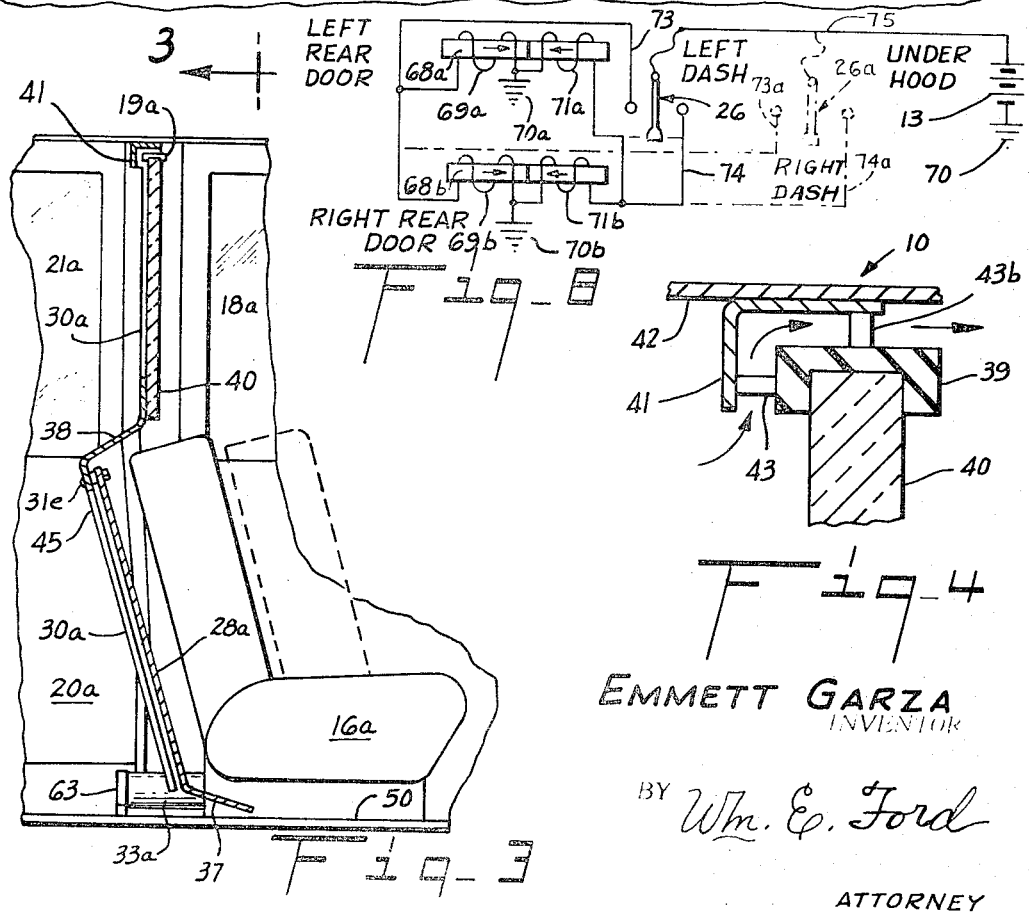

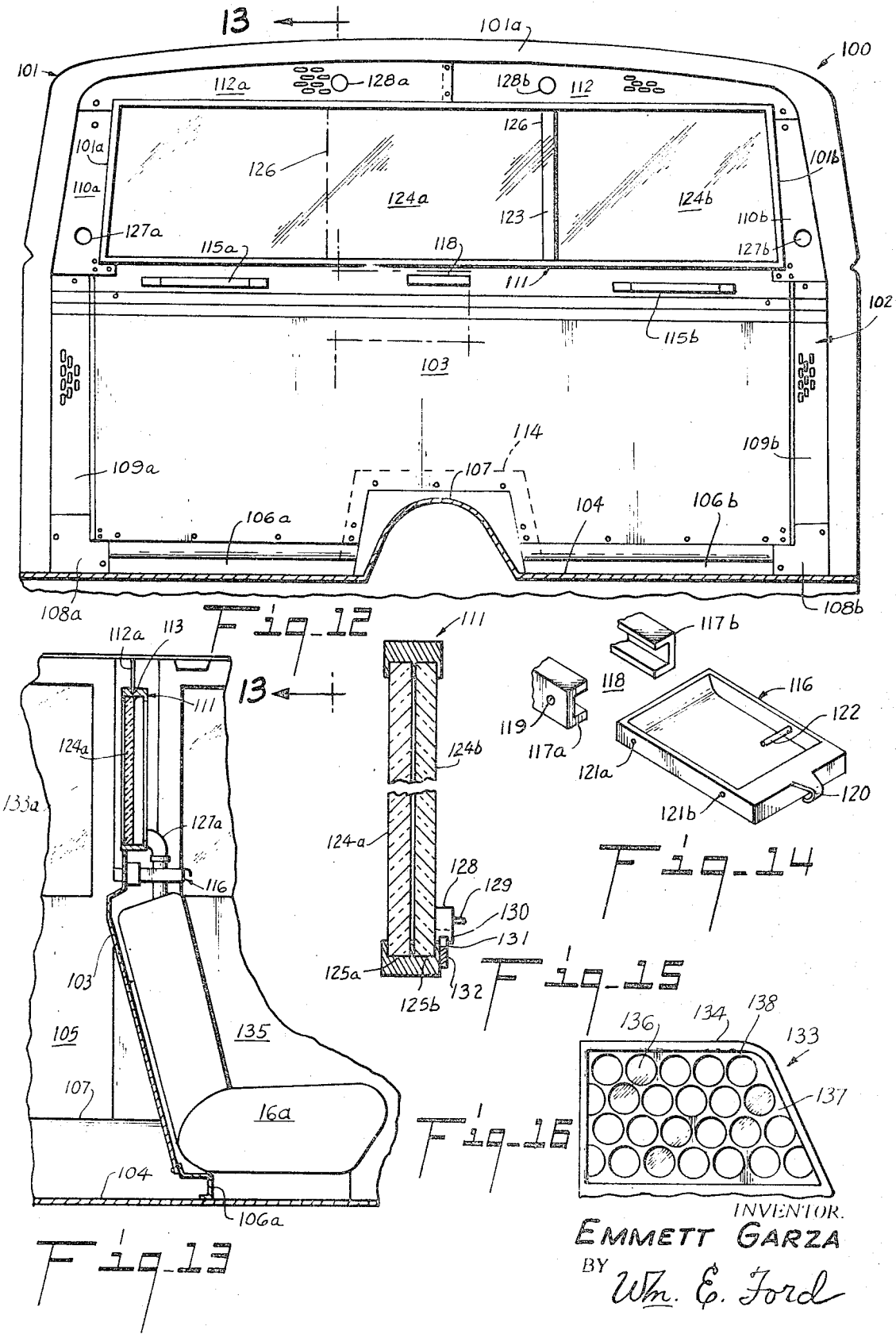

VEHICLES PROTECTED BY ROBBERY DETERRENT APPARATUS

This application is a continuation-in-part of application Ser. No. 690,906 filed Dec. 15, 1967 (now abandoned).

The statement of objects of the parent application, many also being pertinent to this application, are repeated immediately hereinbelow, as follows:

The invention relates to vehicles protected by robbery deterrent apparatus, and to apparatus installable on vehicles, as taxicabs, to deter robbery of the driver by passengers.

As a primary object the invention sets out to provide apparatus installable on vehicles, as taxicabs, to protect the driver against robbery, and also to provide vehicles thus equipped.

It is also an important object of the invention to provide vehicles equipped with robbery deterrent apparatus, in which the apparatus may be permanently installed to offer protection or robbery deterrent from inception.

It is yet another and important object of the invention to provide means automatically operable from the driver's seat to restrain obstreperous passengers while the vehicle may be driven to the police station.

Also it is a further object of the invention to provide protective apparatus of this class designed to leave ample air space communication between driver and passenger compartments to permit voice carriage therebetween and uniform air-conditioning communication.

It is also another object of the invention to provide a manually operable release in case of power failure, whereby to unlock the rear doors of the vehicle to release passengers restrained therein.

It is also another and advantageous object of the invention to provide shielded ducts from the air-conditioning system of the vehicle to the passenger compartment thereof.

It is another object of the invention to provide apparatus of this class which is adjustably assembled to complete a shield means assembly for vehicles of various transverse areas and shapes.

It is also another object of the invention to provide apparatus of this class which may include standardized shield means assemblies initially to fit the transverse cross sections of the few types of automobiles usually employed as taxicabs.

It is an additional and further object of the invention to provide a door through the shield means having a coin tray built therethrough designed to deflect and/or ricochet bullets, with the door hinge being to the left, so the driver may slam the door latched when threatened.

Objects applicable to the part of the invention added as new by this application may be set forth immediately hereinbelow, as follows:

It is another primary object of the invention to provide a shield means which includes an integrated, bullet proof member extending from above floor level just in rear of the front seats to an elevation slightly above the top of the front seats, and having a coin tray therein above the front seat top level.

It is a further object of the invention to provide a shield means which includes two bullet proof, horizontally aligned upper members above a unitary bullet proof member therebelow, one of the transparent members slightly overlapping the other transparent members, and being slidable horizontally thereover.

It is still a further object of the invention to provide ample ducts from the automobile air-conditioning system to pipe air-conditioned air for discharge into the rear compartment.

It is still another and additional object of the invention to provide bullet proof shield means adjacent the automobile sides and top which are perforate for air circulation between compartments.

It is also a further object of the invention to provide perforate bullet proof plates on the inside of the rear doors to upstand and occlude the panes of the rear doors, so a rear seat occupant cannot break a pane and fire forwardly into the front compartment.

It is still an additional object of the invention to provide separate switches to throw the respective rear door lock solenoids, thus to avoid circuit overload as can occur if both solenoids are thrown at once.

Other and further objects will be apparent when the specification herein is considered in connection with the drawings, in which:

FIG. 1 is an isometric view of a taxicab, part in section, showing to small scale apparatus comprised by the invention;

FIG. 2 is an enlarged transverse view, looking forward from the back seat of the cab, and shown part in section;

FIG. 3 is a fragmentary longitudinal sectional elevation of shield means between passenger compartment and front seats, as taken along line 3–3 of FIG. 2;

FIG. 4 is an enlarged, fragmentary, sectional elevational view of details relating to air communication between compartments, as shown to relatively smaller scale in FIG. 3;

FIG. 5 is an enlarged, sectional plan view through the coin tray window;

FIG. 6 is an enlarged, fragmentary, longitudinally extending, elevational view through the coin tray, as taken along line 6–6 of FIG. 5;

FIG. 7 is a transverse, fragmentary, sectional elevational view through the right front window and upper part of right front door;

FIG. 8 is an electrical wiring diagram of the apparatus which locks the right and left rear doors;

FIG. 9 is an enlarged, fragmentary plan view, the right rear door being shown as it has been manually released from locked position.

FIG. 10 is an enlarged, fragmentary isometric view of the bellcrank lever and associated elements shown to smaller scale in FIG. 9;

FIG. 11 is a fragmentary side elevational, part in section and partially diagrammatic, showing right rear door locking and releasing details;

FIG. 12 is a transverse elevational view, from the rear compartment, looking forwardly, showing the shield means that comprises the part of the invention added as new by this application;

FIG. 13 is a fragmentary longitudinal elevational view, part in section, taken along line 13–13 of FIG. 12;

FIG. 14 is an isometric exploded or development view, showing coin tray and coin tray slide details;

FIG. 15 is an enlarged longitudinal, sectional elevational view through the transparent, relatively slidable shield members above the tops of the front seats; and FIG. 16 is a fragmentary view of the inner, upper portion of a right rear door, showing perforate plate protecting the door pane.

Referring now in detail to the drawings of the parent application in which like reference numerals are applied to like elements in the various views, a motor vehicle 10, as a taxicab, is shown in FIG. 1, with standard parts identified as hood 11; battery 12 and air-conditioning system 13 under hood; front or driver compartment 14; dashboard 15; left front and right front seats 16a, 16b; left front and right front doors 17a, 17b; left front and right front windows 18a, 18b, above doors 17a, 17b; left post and right post 19a, 19b between front and rear doors; left rear and right rear doors 20a, 20b; left rear and right rear windows 21a, 21b, above doors; rear or passenger compartment 22; back seat 23; steering wheel 24; also windshield 27. Parts added by the herein in are also indicated in FIG. 1 as the shield means assembly 25 and the toggle switch 26.

Making reference to FIGS. 2 — 4, inclusive, the shield means assembly 25 is shown as including left and right main shield pieces 28a, 28b of bullet resistant material, as hardened, thick plastic sheets; also a bullet resistant center piece 29, and bullet resistant side pieces 30a, 30b. The side pieces 30a, 30b are mounted to the rear of respective main shield pieces 28a, 28b to overlap thereover in part, and left and right vertical rows of aligned small circles represent that these overlapping and overlapped, members are connected, as by bolts and nuts 31a; adjustment being provided for variations in vehicle width by passing the bolts 31a through vertically aligned left and right rows of horizontally extending slots 32a in the left and right shield pieces 28a, 28b. Now, noticeably, left and right side pieces 30a, 30b rest at bottom on bullet resistant duct guards 33a, 33b over air-conditioning ducts 34a, 34b, to be hereinbelow described.

Also, it should be noticed that the center piece 29 rests upon the raised central part or cowl 36 of the vehicle floor 35 under which passes the conventional drive transmission, not shown, which transmits drive to the rear wheels of the vehicle, also not shown in FIG. 1. Vertically aligned bolts 31b pass through the center piece 29 and through vertically aligned horizontally extending slots 32b in the inner edges of the left and right main shield pieces 28a, 28b, with nuts being tightened upon the bolts, as is done conventionally.

Thus the shield assembly 25, to the extent described hereinabove, comprises left side piece 30a supported upon duct guard 33a, center piece 29, supported upon cowl 36, and right side piece 30b supported upon duct guard 30b. Thus the right main shield piece 28b is supported by the center piece 29 and right side piece 30b to dispose its lower part, comprising a skirt or apron 37, at a predetermined distance above the vehicle floor 35, and in like manner the left main shield piece 28a is supported by the center piece 29 and left side piece 30a to dispose its apron or skirt 37 at corresponding predetermined distance above the vehicle floor 35, as best shown in FIG. 3.

A bullet resistant, reenforced transparent sheet 40, as of laminated glass, extends across the upper part of the vehicle above the left and right main shield pieces 28a, 28b, and has vertically extending, horizontally aligned left and right rows of slots 32c, 32d in the lower part thereof. Also, the left and right main shield pieces 28a, 28b, as indicated in FIG. 2, have vertically extending, horizontally aligned, left and right rows of slots 32e, 32f therein.

Thus, a horizontally extending crossmember 38 of elevational configuration shown in FIG. 2, and appearing in transverse cross section as shown in FIG. 3, has horizontally aligned upper and lower rows of bolt holes therein whereby bolts and nuts 31c, 31d may adjustably connect the sheet 40 and the upper part of the crossmember 38 and bolts and nuts 31e, 31f may connect the lower part of the crossmember 38 and the upper parts of the respective left and right main shield members 28a, 28b. Also, upper left and right corner bolts and nuts 32b connect through the center piece 29 and the respective vertical slots 32e, 32f of the crossmember 38.

As shown in FIG. 4, the glass 40 has a rubber or plastic strip, as a mounting cushion 39, that extends along the top edge thereof, and a connection angle 41, connected to the under side 42 of the vehicle top, has transversely spaced apart spacers 43a, 43b which extend respectfully forwardly and downwardly to bear against the channel-shaped cushion 39. The connection angle 41 is connected to the under side 42 of the vehicle top slightly rearwardly of the top light 44, as indicated in dotted lines in FIG. 2. There is air communication, from rear to front, as indicated in FIG. 4, or from front to rear, as top air passes between the cushion 39 and the connection angle 41.

Also, now considering FIG. 3, air can pass between the side pieces 30a, 30b and the respective main shield pieces or members 28a, 28b, spacers 45 being indicated as provided around the bolts that connect the left main shield piece or member 28a and the left side member or piece 30a. Also note in FIG. 3 that there can be air communication between front and rear compartments, as such may pass under the skirt or apron 37, and above the floor 50. By the provision of ample air communication, there can be heard conversation between front and rear, or rear and front, without the necessity of providing voice tubes, and the like.

The glass 40 is notched out centrally at 46 and the crossmember 38 projects upwardly thereinto to provide the frame 47 for a communication door 48 which has the hinge 49 on the left side of the frame 47, the hinge 49 being mounted to swing forwardly. Thus the latch 51 is mounted on the right side of the frame 47 so that the door 48 may be protectively urged closed by the easily applied force of the right arm of the driver sitting in the driver's seat 16a. In order to pass payment from a passenger in the passenger compartment 22 to the driver in front, a coin tray 52 is installed to extend centrally through the door 48. In construction the coin tray 52 may comprise a box-type base 53, with a tray member 54 providing a modified, arcuately or transversely dished shaped receptacle surface 55 designed to reflect or ricochet a bullet should an obstreperous or robbery bent passenger endeavor to fire a pistol therethrough. Otherwise, the driver may take coins and/or bills placed in the tray dish 55, without opening the door 48, and return change back through the tray dish. As viewed in FIG. 6, the door 48 may provide a frame 56 for the tray 52 which may be a rectangle of any conventional structural shape, a modified T-bar shape frame 56 being indicated.

Making reference now to FIG. 7, front door construction is shown in which a conventional left front door 17a is indicated as having a conventional left front window 18a which is lowered into the left front door 17a, for purposes of special ventilation, and which is kept raised, as shown, in cases when the air-conditioning system of the vehicle is being used. FIG. 7 shows a conventional window 18a protected against bullet penetration from the outside of the vehicle, or against a rear seat passenger reaching out the rear window and endeavoring to shoot through the front window disposed to the front thereof. The upper door frame member 57, against which the upper window frame member 58 seats, when the window 18a is in raised position, is in turn connected to or merged into a chassis side strip 64 along the vehicle side just under the top edge strip 66 of the vehicle top 65.

Such upper door frame member 57 has the upper frame member 59a of a protective window frame assembly 59, connected thereto to extend outwardly therefrom to provide the upper mounting structure for a bullet resistant, laminated or thickened, transparent pane 61, which comprises the essential element of the protective window assembly 60. The protective window frame assembly 59, which carries the pane 61, is additionally comprised of side members 59b and a lower frame member 59c. The frame assembly 59 is mounted on a base skirt or apron 62 which is supported upon the top of, and against the outer surface of the door 17a. Also machine bolts or screws and necessary nuts, not shown, may be employed in assembly, as such may be necessary.

As indicated in FIG. 1, ducts 12a and 12b, among others, extend from the air-conditioning system 12 in direction of the dashboard 15, and these ducts 12a and 12b can be ducts which connect with the respective ducts 33a, 33b, which extend along the floor 50 through the front compartment 14 and into the rear compartment 22 as indicated in FIGS. 2 and 3, there to discharge into the rear compartment as through an outlet grill 63, (FIG. 3), comprising the terminal element of each duct. Note also, that the ducts 34a, 34b are covered by bullet resistant shields 33a, 33b, extending thereover from the dashboard in front to the terminal grills at the duct discharge ends.

Referring now to FIGS. 8—11, inclusive, the rear doors 20a, 20b may be latched or locked automatically in emergency, as when rear seat passengers become obstreperous, brandish pistols, or otherwise give evidence of attempting robbery with firearms, or other related felonies and/or misdemeanors. The rear doors 20a, 20b are equipped for such emergencies, and to operate in accordance with the electrical diagram shown in FIG. 8, the conventional pushbutton actuators, as the actuator 69, indicated in dotted lines in FIG. 11, first being demobilized.

Solenoids 68a, 68b are then installed in the respective doors 20a, 20b, the respective coils 69a, 71a and 69b, 71b being installed on the respective solenoid armatures. Note in the diagram of FIG. 8 that the coils 69a, 71a and 69b, 71b are oppositely wound with adjacent ends grounded, as indicated by the common grounds 70a, 70b.

From each solenoid an insulated conductor cord 72 carries the positive coil ends 69a, 71a, and 69b, 71b to a point, as under the front seats, where the door latching coil ends 69a, 69b are joined as a common conductor 73, and the door unlatching coil ends 71a, 71b are joined as a common conductor 74. These two conductors 73, 74 may then, in a common insulated conductor cord, not shown, be extended to the toggle switch 26, hereinabove described as being located on the dashboard 15. The toggle switch 26 is of the type which carries connection via the "hot" wire 75 from the vehicle storage battery 12 at all times, return circuit being completed by the battery ground 70. Thus, if the toggle switch shank or handle 26 is pushed to the right to close circuit 75, 26, 74, the solenoid windings 71a, 71b actuate the respective solenoid armatures 68a, 68b to move them to the left as indicated in FIG. 11, to latch the doors 20a, 20b as will be hereinbelow described in detail. On the other hand, with the doors 20a, 20b latched, if it is desired to unlatch them, the driver may push the toggle switch 26 to the left to close circuit 75, 26, 73, the solenoid windings 69a, 69b actuating the respective armatures 68a, 68b to move them to the right as indicated in FIG. 11, thus to unlatch the doors 20a, 20b, also as will be hereinbelow described.

The solenoids 68a, 68b are contained each in a housing 76, as shown in FIGS. 9 and 11, with the housing base 77 being mounted on a transverse pivot 78. The outer end of the solenoid armature, as the armature 68b, is pivotally connected to a first leg 79 of a bellcrank lever 80, the bellcrank being transversely mounted, approximate its apex, upon a transverse pivot pin 81. The second leg 82 of the bellcrank lever 80 has the forward end 83 of a rod 84 pivotally connected thereto. The rod 84 extends rearwardly from its connection to the bellcrank lever 60, and through a sheath or guide tube 85 to the conventional door latch mechanism, not shown, to which the rod is mechanically or operatively connected in manner that rod movement to the right, FIG. 11, latches the door, and rod movement to the left unlatches the door 20b.

In detail, considering FIG. 10 in conjunction with FIGS. 9 and 11, when the solenoid winding or coil 71b is energized, switch 26 closing circuit to conductor 74, as aforesaid, the solenoid armature 68b is moved to the left, FIG. 11, to urge against the bellcrank lower leg 79 to which the outer end of the solenoid armature 68b is transversely pivotally connected by the clevis 86. As the armature 68b reaches full outward travel, the bellcrank 80 has pivoted about the pivot pin 81 until the bellcrank 80 is disposed in the dotted line position shown in FIG. 10. In this position, the wire rod 84, with end 83 connecting it to the upper bellcrank leg 82, is moved to the right to latch the door 20b, as aforesaid. Conversely, when it is desired to release the solenoid actuation of the conventional latch or lock, the driver needs only to turn the toggle switch 26 to the opposite contact to establish circuit via the conductor 73, thus to energize the solenoid winding or coil 69b to move the armature 68b to the right or back into the solenoid housing 76, thus swinging the bellcrank in counterclockwise direction from dotted line to full-line position, as best shown in FIG. 11. Thus the bellcrank arm 82, in movement, draws the wire rod 84 to the left, and away from the latch or lock, not shown, but of the type conventionally employed in vehicles.

In detail, considering FIG. 10 in conjunction with FIGS. 8, 10 and 11, when the solenoid winding or coil 71b is energized, switch 26 closing circuit to conductor 74, as aforesaid, the solenoid armature 68b is moved to the left, FIG. 11, to urge against the bellcrank lower leg 79 to which the outer end of the solenoid armature 68b is transversely pivotally connected by the clevis 86. As the armature 68b reaches full outward travel, the bellcrank 80 has pivoted about the pivot pin 81 until the bellcrank 80 is disposed in the dotted line position shown in FIG. 10. In this position, the wire rod 84, with end 83 connecting it to the upper bellcrank leg 82, is moved to the right to latch the door 20b, as aforesaid.

Conversely, when it is desired to release the solenoid actuation of the conventional latch or lock, the driver needs only to turn the toggle switch 26 to the opposite contact to establish circuit via the conductor 73, thus to energize the solenoid winding or coil 69b to move the armature 68b to the right or back into the solenoid housing 76, thus swinging the bellcrank in counterclockwise direction from dotted line to full-line position, as best shown in FIG. 11. Thus the bellcrank arm 82, in movement, draws the wire rod 84 to the left, and away from the latch or lock, not shown, but of the type conventionally employed in vehicles. With the wire rod thus operatively withdrawn from the door latch or lock, it may be manually operated to be released, so that the door 20b may be swung open, as shown in FIG. 11.

In case of power failure, as a short or battery failure, a pull cord 86 is provided to be pulled upon by its loop or handle 87, as accessible through the post 19b. Thus, if the power failure has occurred when the rear doors are in latched position, the pull cords 86 may be in the dotted line position shown in FIG. 11, the rear end portion of the cord 86 being connected to the bellcrank leg 82 similarly as the wire rod 84 is connected by its end portion 83. Then, as the pull starts on the bellcrank leg 82, slack begins to be taken up in the pull cord 86, and finally the cord 86 appears straightened out. Thus the pull cord 86 extends from the bellcrank leg 82 directly, without slack, through the end plate 88 of the door 20b, and then to extend through the channel 89 of the post 19b, (not shown in FIG. 11 but shown in FIG. 9), then to extend straight downwardly, or to extend taut and inwardly and forwardly with the handle 87 grasped by the driver or a release manipulator. The bellcrank 80 is thus moved to full-line position, FIG. 11, with the armature 68b urged fully back into the housing 76 and thus the wire rod 84 is withdrawn from operative connection with the conventional latch or lock so that the door 20b may be manually opened to the position shown in FIG. 9.

Then the door 20b may be opened by conventional door latch manipulation, the door being hinged on hinges supported by the post 19b, with such a hinge 90 being shown in FIGS. 9 and 11. As shown in best detail in FIG. 11, the hinge 90 comprises a fixed part 91 mounted on an L-shaped, vertical member 92 comprising part of the construction of the post 19b, a swingable part 93, with end 94 affixed to the door end construction 88, a hinge pin 95 supplying the hinge pivot which pivotally connects the hinge parts 91, 93.

The invention is designed to provide the driver and any other front seat occupant from being shot by riders in the rear or passenger compartment, either by shooting from front to rear or from shooting through the front door windows. Also the invention provides for conducting air-conditioned air from the vehicle air-conditioning unit to the rear or passenger compartment. Furthermore, provision is provided for air intercommunication between front and rear compartments. Thus there is enough intercommunicating space provided for voice carriage, and the necessity for voice tube communication may be foregone. However, a conventional voice tube can be provided. Also, the invention expressly considers a small window from front to rear through which coin and/or bills may be passed, but such window is designed to deflect any bullets endeavored to be fired therethrough. Additionally, the invention provides means for locking the rear doors to lock in obstreperous passengers, as while the driver drives with them to the police station. In this regard, the rear windows are not altered from conventional construction since the rear passengers will be deterred from endeavor to escape therethrough while the vehicle is progressing with any speed. Furthermore, there is a manual release provided to unlock the rear doors in case the electrically powered locking means should fail with the doors in locked position.

In the form of the invention added as new by this application there is shown in FIG. 12 the chassis 101 of a conventional passenger vehicle 100, as employed as a taxicab, with a shield means 102, as viewed from the rear seat, indicated as being comprised of a shield 103 which is supported slightly above the floor 104 of the vehicle rear compartment 105 by a modified channel member 106a, 106b (FIG. 13) on either side of the cowl 107 of the chassis 101, through which passes the shaft, not shown, which transfers traction to the rear of the vehicle.

Lower corner members 108a, 108b connect the outer ends of the respective modified channel members 106a, 106b to upstanding, narrow, perforated, spacing connection members 109a, 109b between the outer edges of the integrally formed shield 103 on the sidewalls or side frames 101a, 101b of the chassis 101. Also, upstanding, narrow, spacing connection members 110a, 110b, are connected at their lower end portions to the respective left and right corners of the shield 103 and upstand thereabove between the vehicle side frame of the chassis 101 and the respective side members of a window frame 111 to be hereinbelow described.

Further, at the top of the window frame 111 two centrally abutting or overlapping, narrow, horizontally extending, perforated strips 112a, 112b, are disposed as spacing connection members underneath the automobile top frame member or chassis top 101a. The window frame 111 is best seen in FIG. 13 as mounted on the top edge of the shield 103, and at the top has a central groove 113 therein in which to receive the top connection or horizontally extending, perforated strips 112a, 112b whereby the window frame is stabilized into a fixed position.

Special features of construction reside in the fact that a filler plate 114 is interposed between the shield 103 and the rear of the front seats tightly to fit about the cowl 107, thus to prevent a bullet fired from the rear seat to pass into the lower part of the forward compartment. Also, it may be noted that grasp handles 115a, 115b are provided to extend rearwardly from the top part of the shield 103 for convenience of the back seat passengers.

As to the coin tray 116, such is provided of configuration indicated in FIG. 14 to be pulled forwardly or pushed rearwardly, the driver grasping the trap handle 120. Spring loaded balls, as detents, not shown, are provided in the track channels 117a, 117b, which are press fitted into either end of the tray slot 118. The tray slot 118, FIG. 12, is also a diagrammatical representation of the whole coin tray 116 and tracks therefor. The small circle 119, FIG. 14, is representative of a retainer nut, which has a recess on the inner side thereof, not shown, to receive a spring, also not shown, which bears upon a ball to urge it into a countersink or hole of reduced proportions, smaller than the diameter of the ball, so that a portion of the ball can extend into detent holes 121a, 121b, shaped as a segment of a sphere corresponding with the ball portion to fit therein. Thus, when the driver grasps the tray handle 120 to urge it rearwardly, the detent or ball, not shown, which may have been seated in the rear segment or detent hole 121a, is unseated and is urged outwardly by the side of the tray until the ball may come to seat in the forward detent hole 121b.

As this occurs the coin tray 116 extends rearwardly so that a passenger on the back seat may deposit coins (and/or bills under the holddown rod 122) in the tray 116, in the amount of taxi fare, (or with tip included). Then the driver may pull the handle 120 forwardly so that the detent ball, indicated diagrammatically by the circle 119, (FIG. 14), again seats in the rear detent hole 121a. The driver may now pick up the fare from the tray 116, as it occupies the position indicated in FIG. 13.

As indicated in FIG. 12, a long transparent pane 124a is fixed within the rear channel 125a of the window frame 111, while, with the compartments completely separated, the short, or slidable pane 124b has been pushed within the forward channel 125b of the window frame 111 to abut within the right side window frame part 101b; an area of overlap being indicated in FIG. 12 by the reference numeral 123. The vertical phantom line 126, FIG 12, is a representation of the leftward position of the left edge of the short, transparent pane 124b, when the fullest opening exists between the compartments. The section of FIG. 13 is indicated as having been taken along line 13-13 of FIG. 12, when the short pane 124b has been moved rightwardly to effect full closure between compartments. On the other hand, the enlarged sectional view of FIG. 15 is indicated as having been taken along the section line 13-13 when the short pane 124b has been pulled the distance to the left, as indicated by the aforesaid phantom line 126, FIG. 12.

As may be visualized from a consideration of FIG. 15 with relationship to FIGS. 12 and 15, and in the preceding paragraphs, a latch or releasable lock may be provided on the short or slidable pane 124b, such a latch being indicated in FIG. 15 as a pawl 128 installed on the lower left front corner of the slidable pane 124a with a handle 129 to be grasped by the driver. The pawl includes a tooth, as of spring steel or leaf spring tooth 130 to be slid over teeth 131 of a rack bar 132 mounted along the lower front face of the window frame 111. Thus the pawl tooth 130 will click from rack tooth 131 to rack tooth 131 as the small pane 124b is slid in its window frame forward channel 125 from open to closed, or from closed to open position.

In this form of the invention flexible ducts, indicated by circles 127a, 127b, FIG. 12, disclose that flexible conduits from the vehicle air-conditioning system discharge into the rear compartment 105, the flexible duct or conduit 127a also being indicated in FIG. 13. Additionally, as indicated by circles 128a, 128b, FIG. 12, flexible conduits may be directed or connected to discharge air-conditioning air into the passenger compartment 105. Such a conduit 127a is indicated in the sectional elevational view of FIG. 13, as rising up in the rear of the forward compartment 135 to discharge into the rear compartment 105.

As shown in FIG. 16, a right rear door 133 is disclosed as including an upper frame 134 to receive therein the rear door pane 136 when it is raised. On the inner side of the door 133, above the inside panel 133a thereof, there is shown installed a bullet proof metal plate 137, to permit observation through the pane 136, because of the size of the perforations 138, but to make it impossible for a rear seat passenger to break out through the door, or to make an opening through the rear door 133 through which to extend his gun hand to fire into the front compartment 135. Obviously, the left rear door 133a, FIG. 13, would have a similar perforated plate 137 installed thereover to protect against the same eventuality.

Obviously the added form of the invention must include the features shown in FIGS. 8—11, inclusive, as regards locking the rear doors in case of the actions of a rear seat passenger give occasion for a driver to deliver him into police custody. However, since it has been found that the operation of the solenoids which lock both rear doors closed can draw too much current, the circuitry shown in FIG. 8 may be altered so that the solenoids 68a, 68b may be operated independently. This separated circuitry is indicated in FIG. 8 by the addition of a switch 26a with conductor 73a from a left post extending for connection to the solenoid coil 69b, while the connection between the left and right rear door solenoid coil 69a, 69b are severed.

Also, the conductor 74a is shown in phantom lines leading from the post to the right of the switch 26a to the right rear door solenoid 71b, while the connection between the left and right rear door solenoid coils 71a, 71 b are severed. In this case conductor 74 from the post to the right of the switch extends directly for connection to the left rear door solenoid coil 71a. The designation RIGHT DASH indicates the location of the newly added switch 26a.

The invention considers that every part of the shield means 102 is constructed of a bullet proof material, including the connection and spacer members 109a, 109b, 110a, 110b, 112a, 112b; also the corner anchors 108a, 108b, and the closure plate 114. The fact that a large part of the shield means 102 may be comprised of a single, unitary, opaque sheet 103 of specially hardened plastic is of great advantage. Also, the window frame 111 must be of bullet proof metal, and the transparent panes 124a, 124b are of heavy, bullet proof glass or transparent plastic, while the coin tray 116 is also of bullet proof metal.

The features shown in FIGS. 1—11 and those shown in FIGS. 12—16 may be used interchangeably, and in any combinations, as long as corresponding features are not in contrast as to structures. Also, both the forms of invention shown in FIGS. 1—12, and those shown in FIGS. 11—16 are by way of illustration rather than by way of limitation.

I claim:

1. In combination with a motor vehicle having a chassis including a rearwardly disposed passenger compartment closed by left and right rear doors, and successively forward thereof, driver's seat and right front seat, a forward compartment enclosed sidewardly by left and right front doors with windows thereabove and forwardly enclosed by a dashboard and windshield thereabove and having a steering wheel accessible from the driver's seat, and vehicle powered circuit means, apparatus resisting robbery and for adapting said vehicle to use said apparatus comprising, bullet resistant shield means extending from substantially compartment floor level behind said seats upwardly and sidewardly into substantial close proximity to said chassis top and sides, said shield means having a coin tray therein above said seats adapted to be slid rearwardly and returned forwardly, and above said coin tray said shield means including a pair of bullet proof, transparent panes slightly overlapping horizontally when closed and slidable horizontally one over the other when opening said shield means, and bullet proof perforate means included by said shield means for connection sidewardly and at the top to said chassis, latch means in said left and right rear doors, said vehicle powered circuit means including switch means adjacent driver position and adapted in a latching position to project said latch means for rear door latching in positively closed position, and adapted in an unlatching position to release said latch means.

2. A vehicle including robbery deterrent apparatus as claimed in claim 1, which additionally includes flexible duct means from the vehicle air-conditioning system to said rear compartment.

3. A vehicle including robbery deterrent apparatus as claimed in claim 1 in which said switch means includes a switch for each rear door latch means, and in which said vehicle powered circuit means is connected for separate latch means actuation as said separate switches are closed.

4. A vehicle including robbery deterrent apparatus as claimed in claim 1 in which said rear doors include bullet proof, perforate plate means to protect the respective rear door transparent panes when they are in raised position against being broken by a rear seat occupant, while permitting good vision through the panes.

5. A vehicle including robbery deterrent apparatus as claimed in claim 1 in which said switch means connection to the vehicle battery comprises a live conductor.

6. A vehicle including robbery deterrent apparatus as claimed in claim 1, which additionally includes voice tube means for assuredly audible conversation between passenger and forward compartment.

7. A vehicle including robbery deterrent apparatus as claimed in claim 1, which additionally includes manually pulled means to unlatch said rear doors in case of electrical failure.

8. In combination with a motor vehicle having a rearwardly disposed passenger compartment closed by left and right rear doors, and successively forward thereof, driver's seat and right front seat, a forward compartment enclosed sidewardly by left and right front doors with windows thereabove and forwardly enclosed by a dashboard and windshield thereabove and having a steering wheel accessible from the driver's seat, apparatus resisting robbery and for adapting said vehicle to use said apparatus comprising, bullet resistant shield means extending from substantially compartment floor level behind said seats and upwardly, spacer means spacing said shield means to provide air space communication between said compartments, a bullet resistant crossmember with lower portion connected to said shield means and extending thereabove, bullet resistant, transparent sheet means connected to the upper portion of said crossmember and extending thereabove to the top of said vehicle, bullet resistant, pane means disposed upwardly over said left and right front doors, latch means in said left and right rear doors, vehicle powered circuit means including switch means adjacent driver position and adapted in a latching position to project said latch means to latch said rear doors in positively closed position, and adapted in an unlatching position to release said latch means, and a coin door provided in said crossmember having a coin tray therethrough hardened and contoured to ricochet and deflect bullets.

9. A vehicle including robbery deterrent apparatus as claimed in claim 8 in which said shield means comprises left and right main shield pieces with upper portions adjustably, vertically connectable in elevation to said crossmember forwardly thereof, and a center piece connectable to said main shield pieces and adjustably vertically connected to said crossmember rearwardly thereof.

10. A vehicle including robbery deterrent apparatus as claimed in claim 8 in which said shield means comprises left and right main shield pieces with upper portions adjustably, vertically connectable in elevation to said crossmember forwardly thereof, and a center piece connectable to said main shield pieces and adjustable vertically connected to said crossmember rearwardly thereof, said shield means also including side pieces adjustably, horizontally connected to adjacent main shield pieces and supported above vehicle floor as said center piece is supported from the vehicle floor cowl.

11. A vehicle including robbery deterrent apparatus as claimed in claim 8 in which said shield means comprises left and right main shield pieces with upper portions adjustably, vertically connectable in elevation to said crossmember forwardly thereof, and a center piece connectable to said main shield pieces and adjustably vertically connected to said crossmember rearwardly thereof, said main pieces each including a forwardly extending skirt terminating under the seat forwardly thereof and slightly above the vehicle floor.